United States Patent
Mogre et al.

(10) Patent No.: US 8,811,427 B2
(45) Date of Patent: Aug. 19, 2014

(54) METHOD FOR DATA TRANSMISSION IN A COMMUNICATION NETWORK

(75) Inventors: Parag Mogre, München (DE);
Guillaume Vernet, Villeurbanne (FR);
Andreas Ziller, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/579,137

(22) PCT Filed: Jan. 28, 2011

(86) PCT No.: PCT/EP2011/051224
§ 371 (c)(1),
(2), (4) Date: Aug. 15, 2012

(87) PCT Pub. No.: WO2011/101221
PCT Pub. Date: Aug. 25, 2011

(65) Prior Publication Data
US 2012/0307674 A1 Dec. 6, 2012

(30) Foreign Application Priority Data
Feb. 16, 2010 (EP) .................................. 10001573

(51) Int. Cl.
*H04J 3/16* (2006.01)
*H04L 12/56* (2006.01)
*H04L 12/64* (2006.01)

(52) U.S. Cl.
CPC ............ *H04J 3/1682* (2013.01); *H04L 47/522* (2013.01); *H04L 2012/6456* (2013.01)
USPC ....................................................... 370/468

(58) Field of Classification Search
CPC .................... H04L 47/522; H04L 2012/6456; H04J 3/1682
USPC ........................................................ 370/468
See application file for complete search history.

(56) References Cited

U.S. PATENT DOCUMENTS

| | | | |
|---|---|---|---|
| 6,125,105 A | 9/2000 | Edwards et al. | 370/230 |
| 7,349,377 B2 | 3/2008 | Le et al. | 370/338 |

(Continued)

FOREIGN PATENT DOCUMENTS

| | | | |
|---|---|---|---|
| CN | 1682510 A | 10/2005 | H04L 12/56 |
| EP | 0883075 A2 | 12/1998 | G06F 13/00 |

OTHER PUBLICATIONS

Aussem, A., et al., "Web Traffic Demand Forecasting using Wavelet-Based Multiscale Decomposition", International Journal of Intelligent Systems, vol. 16; pp. 215-236, 2001.

(Continued)

*Primary Examiner* — Phuc Tran
(74) *Attorney, Agent, or Firm* — King & Spalding L.L.P.

(57) ABSTRACT

A method for data transmission from a first node to a second node in a communication network includes: analyzing data arriving in a buffer of the first node to generate an arrival history curve describing the amounts of data arriving in the buffer over a past time period; processing the arrival history curve to generate a plurality of signals corresponding to filtered components of the wavelet transform; processing each signal in a separate neural network trained with training patterns based on previously received and buffered data to generate forecast signals for future data arrivals; recombining the forecast signals to generate an arrival forecast curve describing the amounts of data arriving in the buffer in a future period; the first node generating bandwidth reservation requests based on the arrival forecast curve and transmitting the bandwidth requests to the second node; the second node allocating bandwidth based on the bandwidth requests; and transmitting data from the first node to the second node within the allocated bandwidth.

20 Claims, 8 Drawing Sheets

(56) References Cited

U.S. PATENT DOCUMENTS

| | | | |
|---|---|---|---|
| 7,787,469 B2* | 8/2010 | Sharma | 370/395.21 |
| 7,916,683 B2* | 3/2011 | Kwon et al. | 370/322 |
| 2007/0189298 A1 | 8/2007 | Wong et al. | 370/395.1 |
| 2007/0248072 A1* | 10/2007 | Kwon et al. | 370/345 |
| 2009/0109916 A1* | 4/2009 | Berg et al. | 370/329 |
| 2010/0260153 A1* | 10/2010 | Hollick et al. | 370/336 |
| 2012/0014255 A1* | 1/2012 | Svedberg | 370/235 |

OTHER PUBLICATIONS

Barford, P, et al., "A Signal Analysis of Network Traffic Anomalies", Proceedings of ACM SIGCOMM Internet Measurement Workshop, 12 pages, 2002.

Chong, S., et al., "Dynamic Bandwidth Allocation for Efficient Transport of Real-Time VBR Video over ATM", INFOCOM'94, Networking for Global Communications, pp. 81-90; pp. 81-90, Jun. 1994.

Krithikaivasan, B., et al., "ARCH-Based Traffic Forecasting and Dynamic Bandwidth Provisioning for Periodically Measured Nonstationary Traffic", IEEE/ACM Transactions on Networking, vol. 15, No. 3; pp. 683-696, Jun. 2007.

Groschwitz, N., et al., "A Time Series Model of Long-Term NSFNET Backbone Traffic", IEEE ICC'94, vol. 3; pp. 1400-1404, 1994.

European Search Report, EP Application No. 1001573.4-1249,7 pages, Jul. 5, 2010.

International PCT Search Report and Written Opinion, PCT/EP2011/051224, 13 pages, Mar. 1, 2011.

Chinese Office Action, Application No. 201180009782.X, 11 pages, Apr. 25, 2014.

\* cited by examiner

METHOD FOR DATA TRANSMISSION IN A COMMUNICATION NETWORK

CROSS-REFERENCE TO RELATED APPLICATIONS

This application is a U.S. National Stage Application of International Application No. PCT/EP2011/051224 filed Jan. 28, 2011, which designates the United States of America, and claims priority to EP Patent Application No. 10001573.4 filed Feb. 16, 2010. The contents of which are hereby incorporated by reference in their entirety.

TECHNICAL FIELD

This disclosure relates to a method for data transmission in a communication network as well as to a method for generating bandwidth requests. Furthermore, the disclosure relates to a network node and a communication network.

BACKGROUND

In communication networks using bandwidth reservations for transmitting data, there is the desire to provide an optimal bandwidth reservation scheme. Such an optimal scheme reserves just sufficient bandwidth for transmission and at a proper time, i.e., the required bandwidth is available to the node in the communication network for transmissions when needed without additional delay. Especially in TDMA networks (TDMA=Time Division Multiple Access), there is a need for an online estimation of bandwidth requirements during run-time of the network. This is because control mechanisms required to reserve bandwidth and compute conflict free transmission schedules involves some inherent latency. The prediction of the bandwidth demand in the future is challenging as complex traffic patterns with quickly changing load have to be taken into account. As the reservation process of new bandwidth is time constrained, it is essential to have a good view on the development of the bandwidth demand in the near future.

The problem of bandwidth requirement estimation and more generally traffic prediction has been studied in many different fields of technologies, such as communication networks, public transportation, electrical and hydraulic networks. In document [1], the so-called ARIMA model (ARIMA=Auto Regressive Integrated Moving Average) is used to predict the bandwidth requirement on a backbone. In this model, the time series is derived until it becomes stationary, then weight coefficients are computed and the forecast uses the weighted sum of the past moving averages. In document [2], an ARCH model (ARCH=Auto Regressive Conditional Heteroskedasticity) is used to forecast bandwidth and help data providers to adjust their bandwidth allocation. This method is based on a quantized approach to allocate and deallocate a bandwidth quantum with different policies.

In document [3], a neural network approach is described to predict needed bandwidth for transmission of a video flow. The publication [4] describes a method to forecast web traffic based on time series of averaged web session measurements. In this document, a wavelet decomposition is coupled with neural networks for prediction. The method in this document does not describe a bandwidth reservation mechanism for data transmission between two nodes in a communication network. Document [5] discloses the use of wavelet filtering to decompose a signal of multiple scales in order to ease information extraction for detecting network traffic anomalies.

SUMMARY

In one embodiment, a method for data transmission in a communication network comprising a plurality of nodes where a data transmission from a first node to a second node in the network comprises the steps of: (a) analysing data arriving in a data buffer of the first node such that an arrival history curve describing the amounts of data arriving in the buffer over a past time period is generated; (b) processing the arrival history curve, said processing including a wavelet transform on the arrival history curve and resulting in a plurality of signals, each signal corresponding to a filtered component of the wavelet transform; (c) processing each signal in a separate neural network trained with training patterns which are based on data arrived in the past in the buffer, resulting in forecast signals for data arrivals in the future; (d) recombining the forecast signals resulting in an arrival forecast curve describing the amounts of data arriving in the buffer in a future time period; (e) generating bandwidth requests for reserving bandwidth based on the arrival forecast curve by the first node and transmitting the bandwidth requests from the first to the second node; (f) allocating bandwidth based on the bandwidth requests by the second node; and (g) transmitting data from the first node to the second node within the allocated bandwidth.

In a further embodiment, data is transmitted as MAC protocol data units on the MAC layer. In a further embodiment, data is transmitted in a data subframe of a predetermined time interval and control messages including bandwidth requests are transmitted in a control subframe of the predetermined time interval. In a further embodiment, the communication network is a wireless network operated in the MeSH mode of standard IEEE 802.16. In a further embodiment, the wavelet transform in step (b) is based on the Haar wavelet as the mother wavelet. In a further embodiment, each filtered component of the wavelet transform includes a plurality of coefficients, each coefficient being associated with a time step in the past time period, the time steps being different for each filtered component. In a further embodiment, each filtered component is compacted by merging coefficients with the same value in adjacent time steps in the past time period, the compacted signal being the signal generated in step (b). In a further embodiment, each neural network includes a plurality of input neurons and output neurons, where each input neuron receives a merged coefficient in the past and each output neuron provides merged coefficients in the future.

In a further embodiment, a signal correction is applied in step c) on the outputs of the neural networks based on values of earlier training patterns. In a further embodiment, the neural networks are trained during data transmission in regular time intervals or continuously. In a further embodiment, the bandwidth requests generated in step (e) specify an amount of data to be reserved for transmission and a persistence value defining a time length for which the amount of data is to be reserved. In a further embodiment, the bandwidth requests are generated in step (e) by: transferring the arrival forecast curve in a quantized forecast curve which is quantized based on a data size unit used for reserving bandwidth; and applying a filling procedure for filling the area under the quantized forecast curve with bandwidth requests being represented by rectangles having a length in the time direction corresponding to the time length according to the persistence value of the bandwidth request and having a height corresponding to the amount of data specified in the bandwidth request.

In a further embodiment, the filling procedure comprises the steps of: (i) detecting left and right boundaries by scanning the quantized forecast curve in successive scans in the time direction, where areas covered between a left and right boundary within a scan are associated with a first rectangle; (ii) merging first rectangles with the same left and right boundaries to second rectangles; and (iii) filling the second rectangles in the time direction with rectangles of bandwidth requests such that a minimum number of rectangles is included in each second rectangle. In a further embodiment, step (ii) includes an overfitting procedure in which the length of each second rectangle is increased by a predetermined value and, in case that this increase results in adjacent or overlapping second rectangles which can be merged to a new second rectangle, the new second rectangle substitutes for the adjacent or overlapping second rectangles. In a further embodiment, the rectangles of bandwidth requests having the same left and right boundaries are merged to one bandwidth request. In a further embodiment, the state of the buffer in the first node is monitored and additional bandwidth requests are sent based on the state of the buffer for correcting errors in the arrival forecast curve.

In another embodiment, a method is provided for transmitting bandwidth requests in a communication network comprising a plurality of nodes, particularly for use in a method according to one of the preceding claims, wherein a bandwidth request issued by a node in the network includes a field indicating a desired start time at which the bandwidth according to the bandwidth request should be allocated. In a further embodiment, the communication network is a wireless communication network operated in the MeSH mode of standard IEEE 802.16 where the bandwidth request is included in a MSH-DSCH message.

In another embodiment, a network node is provided for use in any of the methods disclosed above, the network node comprising: analysing means for analysing data arriving in a data buffer of the node such that an arrival history curve describing the amounts of data arriving in the buffer over a past time period is generated; processing means for processing the arrival history curve, said processing means performing a wavelet transform on the arrival history curve and generating a plurality of signals, each signal corresponding to a filtered component of the wavelet transform; neural network processing means for processing each signal in a separate neural network trained with training patterns which are based on data arrived in the past in the buffer, resulting in forecast signals for data arrivals in the future; recombining means for recombining the forecast signals resulting in an arrival forecast curve describing the amounts of data arriving in the buffer in a future time period; generating means for generating bandwidth requests for reserving bandwidth based on the arrival forecast curve and transmitting the bandwidth requests to a second node; and scheduling means for transmitting data to the second node based on the bandwidth allocated by the second node in response to the bandwidth requests.

In a further embodiment, the network node comprises transmitting means for transmitting bandwidth requests including a field indicating a desired start time at which the bandwidth according to the bandwidth request should be allocated; and/or processing means for receiving bandwidth requests including a field indicating a desired start time and for allocating bandwidth according to the respective bandwidth request at the desired start time.

In another embodiment, a communication network comprises a plurality of nodes, wherein the communication network is adapted to perform any of the methods disclosed above.

BRIEF DESCRIPTION OF THE DRAWINGS

Example embodiments will be explained in more detail below with reference to figures, in which.

DETAILED DESCRIPTION

Some embodiments provide a bandwidth reservation mechanism in a communication network enabling a correct and reliable bandwidth allocation based on the expected network traffic.

The method for data transmission according to certain embodiments is used in a communication network comprising a plurality of nodes. For a data transmission from a first node to a second node in the network, several steps are performed. In a step a), data arriving in a data buffer of the first node are analyzed such that an arrival history curve describing the amounts of data arriving in the buffer over a past time period is generated. In a step b), a processing of the arrival history curve is performed where said processing includes a wavelet transform on the arrival history curve and results in a plurality of signals, each signal corresponding to a filtered component of the wavelet transform. In a step c), each signal generated by the wavelet transform is processed in a separate neural network trained with training patterns, said training patterns being based on data arrived in the past in the buffer. This results in forecast signals for data arrivals in the future, i.e. in a future time period.

In a step d), the generated forecast signals are recombined resulting in an arrival forecast curve describing the amounts of data arriving in the buffer in a future time period. Thereafter, in a step e), bandwidth requests for reserving bandwidth based on the arrival forecast curve are generated by the first node and transmitted from the first to the second node. In a step f), bandwidth based on the bandwidth requests is allocated by the second node. In a final step g), data from the first node to the second node is transmitted within the bandwidth allocated by the second node.

The method provides a new mechanism to reserve bandwidth for data transmission in communication networks. This mechanism uses a prediction framework based on a wavelet transform and neural networks generating a forecast of the bandwidth with a demand in the future. The method enables a data transmission where the actual available bandwidth better matches the bandwidth required for the data streams to be transmitted. This leads to a better transmission quality in terms of delay and throughput. Particularly, the method enables a data transmission with a precise reservation of bandwidth in advance in a flexible form as needed by the traffic arriving in a node.

In one embodiment, data is transmitted as MAC protocol data units/packets on the well-known MAC layer also called L2 layer.

In another embodiment, the method uses predetermined time intervals for transmitting data and control messages. Particularly, the predetermined time interval comprises a data subframe in which data is transmitted and a control subframe in which control messages including the above mentioned bandwidth requests are transmitted.

The method may be used in a wireless network operated in the so-called MeSH mode of the well-known standard IEEE 802.16, particularly the standard IEEE 802.16-2004.

Various wavelet transforms based on different mother wavelets may be used in the method disclosed herein. In one embodiment, the wavelet transform is based on the known so-called Haar wavelet as the mother wavelet. A wavelet transform based on this mother wavelet is explained in the detailed description of the application.

In another embodiment, each filtered component of the wavelet transform includes a plurality of (wavelet) coefficients, each coefficient being associated with a time step in the past time period, the time steps being different for each filtered component. In one variant of this embodiment, each filtered component is compacted by merging coefficients with the same value in adjacent time steps in the past time period, the compacted signal being the signal generated in step b). Each neural network may include a plurality of input neurons and output neurons, where each input neuron receives a merged coefficient in the past and each output neuron provides a merged coefficient in the future.

In order to improve the forecast quality, one embodiment applies a signal correction in step c) on the outputs of the neural networks based on values of earlier training patterns. In order to adapt the neural networks to the actual arrival history, the neural networks may be trained during data transmission in regular time intervals or continuously.

In another embodiment, the bandwidth requests generated in step e) specify an amount of data to be reserved for transmission and a persistence value defining a time length for which the amount of data is to be reserved. In this embodiment, the bandwidth requests may be generated in step e) as follows:
transferring the arrival forecast curve in a quantized forecast curve which is quantized based on a data size unit used for reserving bandwidth;
applying a filling procedure for filling the area under the quantized forecast curve with bandwidth requests being represented by rectangles having a length in the time direction corresponding to the time length according to the persistence value of the bandwidth request and having a height corresponding to the amount of data specified in the bandwidth request.

The above mentioned data size unit may correspond to a minislot in the aforementioned standard IEEE 802.16.

In one embodiment, the above described filling procedure may comprise the following steps:
i) detecting left and right boundaries by scanning the quantized forecast curve in successive scans in the time direction, where areas covered between a left and right boundary within a scan are associated with a first rectangle;
ii) merging first rectangles with the same left and right boundaries to second rectangles;
iii) filling the second rectangles in the time direction with rectangles of bandwidth requests such that a minimum number of rectangles is included in each second rectangle.

In the above defined step ii), the merging between the first rectangles may be performed by allowing an extra amount of data, e.g. in a number of extra minislots, to be covered by this rectangle and by doing so to merge two or more rectangles. Furthermore, an additional overfitting procedure may be used in step ii) in order to further reduce the number of rectangles. According to this additional overfitting procedure, the length of each second rectangle is increased by a predetermined value and, in case that this increase results in adjacent or overlapping second rectangles which can be merged to a new second rectangle, the new second rectangle substitutes for the adjacent or overlapping second rectangles.

Furthermore, in another embodiment, the rectangles of bandwidth requests having the same left and right boundaries are merged to one bandwidth request. This mechanism also reduces the number of bandwidth requests. In order to account for wrong forecasts in the method disclosed herein, the state of the buffer in the first node may be monitored and additional bandwidth requests are sent based on the state of the buffer for correcting those errors.

Besides the above data transmission method, some embodiments provide a method for transmitting bandwidth requests in a communication network comprising a plurality of nodes, said method being particularly usable in the above data transmission method. In this method, a bandwidth request issued by a node in the network includes a field indicating a desired start time at which the bandwidth according to the bandwidth request should be allocated. This method enables an easy and straightforward mechanism for allocating bandwidth in the above described data transmission method. The method for transmitting bandwidth requests may be used in a wireless communication network operated in the MeSH mode of standard IEEE 802.16 where the bandwidth request including the field for the desired start time is included in a so-called MSH-DSCH message. The length for the field indicating the desired start frame may be an 8 bit field.

Besides the above specified method, some embodiments provide a network node for use in the data transmission method as described above. This node comprises the following components:
analysing means for analysing data arriving in a data buffer of the node such that an arrival history curve describing the amounts of data arriving in the buffer over a past time interval is generated;
processing means for processing the arrival history curve where said processing performs a wavelet transform on the arrival history curve and generates a plurality of signals, each signal corresponding to a filtered component of the wavelet transform;
neural network processing means for processing each signal in a separate neural network trained on training patterns which are based on data arrived in the past in the buffer, resulting in forecast signals for data arrivals in the future;
recombining means for recombining the forecast signals resulting in an arrival forecast curve describing the amounts of data arriving in the buffer in a future time period;
generating means for generating bandwidth requests for reserving bandwidth based on the arrival forecast curve and transmitting the bandwidth requests to a second node;
scheduling means for transmitting data to the second node based on the bandwidth allocated by the second node in response to the bandwidth requests.

Furthermore, some embodiments provide a network node for use in the above described method for transmitting bandwidth requests. This node comprises transmitting means for transmitting bandwidth requests including a field indicating a desired start time at which the bandwidth according to the bandwidth request should be allocated. Additionally or alternatively, the node comprises processing means for receiving bandwidth requests including a field indicating a desired start time and for allocating bandwidth according to the respective bandwidth request at the desired start time.

Figure 1:
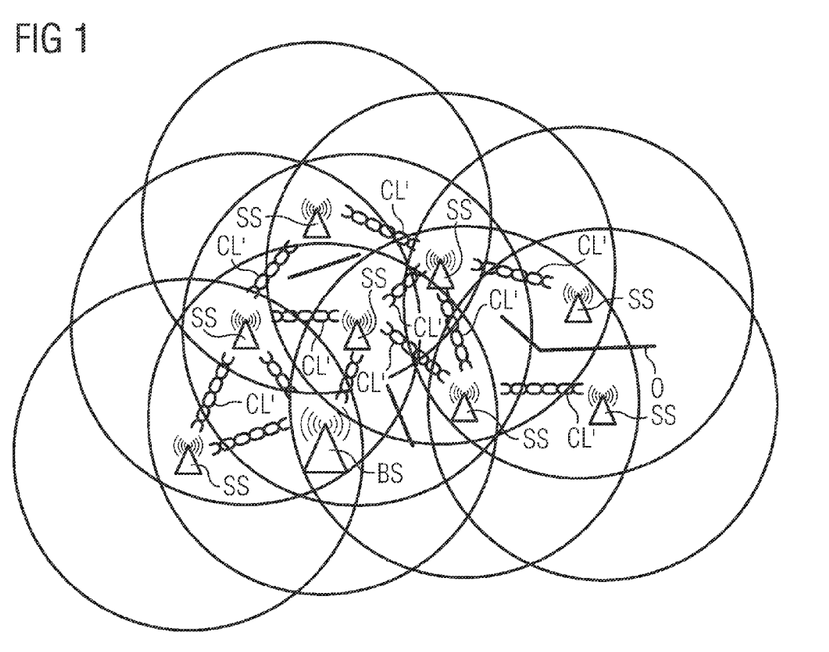
FIG. 1 shows a topology in the MeSH mode operation in the wireless communication standard IEEE 802.16.

An example embodiment will now be described with respect to a wireless communication network being operated in the so-called MeSH mode of the IEEE standard 802.16. This standard is a wireless communication standard supporting metropolitan area networks, rural networks or enterprise-wide networks. FIG. 1 shows such a wireless communication network being operated in the MeSH mode. The network comprises a plurality of nodes comprising subscriber stations as well as base stations communicating with each other. In the MeSH mode shown in FIG. 1, the subscriber stations SS are allowed to establish communication links between neighbouring nodes and are able to communicate with each other directly as indicated by corresponding communication links CL'. Furthermore, obstacles occurring between the nodes in the network are designated with reference signs O. The subscriber stations SS are also able to send traffic to and receive traffic from corresponding base stations BS, where a base station in the MeSH mode is treated as a subscriber station SS which provides backhaul services to the MeSH network. The MeSH mode of the IEEE standard 802.16 allows a flexible growth in the coverage of the MeSH network and increases the robustness of the network due to the provision of multiple alternate passes for communication between nodes.

The standard IEEE 802.16 describes a TDMA-based transmission (TDMA=Time Division Multiple Access) where MAC protocol data units (MAC=medium access control) are transmitted in data subframes and control data referring to messages controlling the data transmission are transmitted in control subframes. Both the data subframes and the control subframes are part of an overall time frame. This time frame is divided into a plurality of time slots. The data transmitted in those time slots is divided in so-called minislots. The control messages used in the MeSH mode are so-called MSH-DSCH messages.

In the embodiment described in the following, each of the nodes SS and BS includes an architecture for reserving bandwidth based on forecasts of bandwidths needed in the future, where the forecast is derived by the data arriving in a corresponding buffer of a node.

Figure 2:
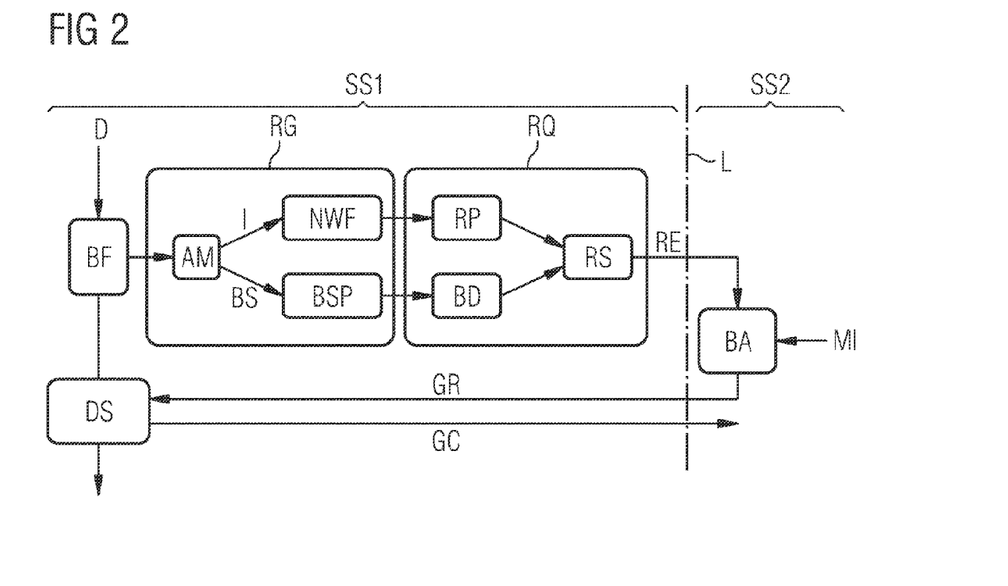
FIG. 2 shows a schematic view of an architecture for implementing an example embodiment.

FIG. 2 shows an architecture illustrating the bandwidth reservation according to an example embodiment. In FIG. 2, the components left from the line L refer to a first node/subscriber station SS1 in the wireless communication network wishing to transmit data to a second node/subscriber station SS2 located on the right side of line L. According to FIG. 2, data in the form of MAC data packets D arrives in the buffer BF of the node SS1. This data is to be transmitted based on minislots within the data subframe to the second node SS2. To do so, bandwidth has to be reserved and allocated by the second node SS2. In conventional systems, bandwidth was reserved on the current data arrival in the buffer BF resulting in a delay in data transmission due to the so-called three-way handshake process used for reserving bandwidth in the second node. The handshake process is well-known in the standard IEEE 802.16 and describes how bandwidth is reserved. This process will be explained in more detail below.

Contrary to conventional systems, the system as shown in FIG. 2 provides an advance bandwidth reservation by forecasting future bandwidth demands based on the buffer BF. To do so, an arrival history is generated by an analysing means AM from the data arrivals in the buffer BF. This arrival history forms an input signal I for a neural wavelet forecaster NWF. The forecaster NWF and the analysing means AM are part of a reference generator RG. The input signal I is specified by the amount of data in bytes that entered the buffer BF at each time frame in a past time interval. Furthermore, a signal BS specifying the buffer states is generated by the analysing means AM and input to a buffer state processor BSP which is also part of the reference generator RG. The output of the buffer state processor is input to a so-called buffer drainer BD being part of a component called request generator RQ. The functions of the components BSP and BD will be explained later on.

The request generator RQ further includes a request packer RP receiving an output of the neural wavelet forecaster NWF and generating bandwidth requests RE which are sent by the request sender RS to the second node SS2. Furthermore, bandwidth requests are also generated by the buffer drainer BD. These bandwidth requests are also sent by the request sender RS to the second node SS2. The bandwidth requests RE are received in the second node in a bandwidth allocator BA allocating the bandwidth as specified in the bandwidth request RE. The bandwidth allocation is done based on corresponding minislots designated as MI in FIG. 2. In the process of bandwidth allocation the bandwidth allocator BA sends in response to a bandwidth request RE a grant GR to the data scheduler DS of the first node SS1. This data scheduler is responsible for scheduling the data transmission based on the grants. After having received the grant GR, a grant confirm GC is sent back from the data scheduler DS to the second node SS2. According to the standard IEEE 802.16, allocated bandwidth can only be used by the first node after having sent the grant confirm. This restriction is implemented in order to avoid collisions because the above control messages RE, GR and GC are broadcasted in the network. The described exchange of a bandwidth request RE, a grant message GR and a grant confirm GC corresponds to the above mentioned three-way handshake.

Figure 3:
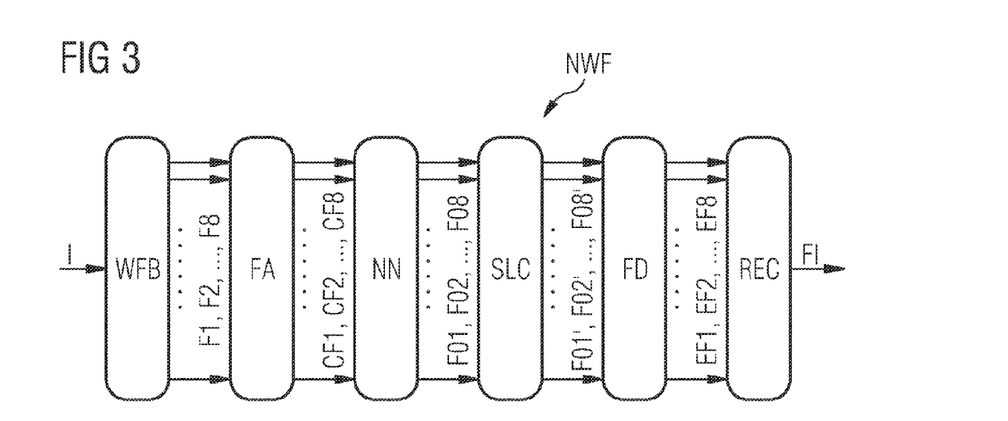
FIG. 3 shows a detailed view on the neural wavelet forecaster shown in FIG. 2.

In the following, a specific example based on the architecture of FIG. 2 will now be explained in detail. In this example, the arriving history comprises the data amounts arrived in the buffer BF in the past 512 (time) frames. Hence, the input I describes a curve in a two-dimensional diagram, where the abscissa corresponds to the frames f and the ordinate corresponds to data amounts A in bytes. An example of such an input signal is shown in the diagrams D1 to D4 of FIG. 5. The forecast of future data arrivals used for generating corresponding bandwidth requests are computed by the neural wavelet forecaster NWF of the reference generator RG. FIG. 3 shows the subcomponents of this forecaster which will be explained in detail in the following.

Figure 4:
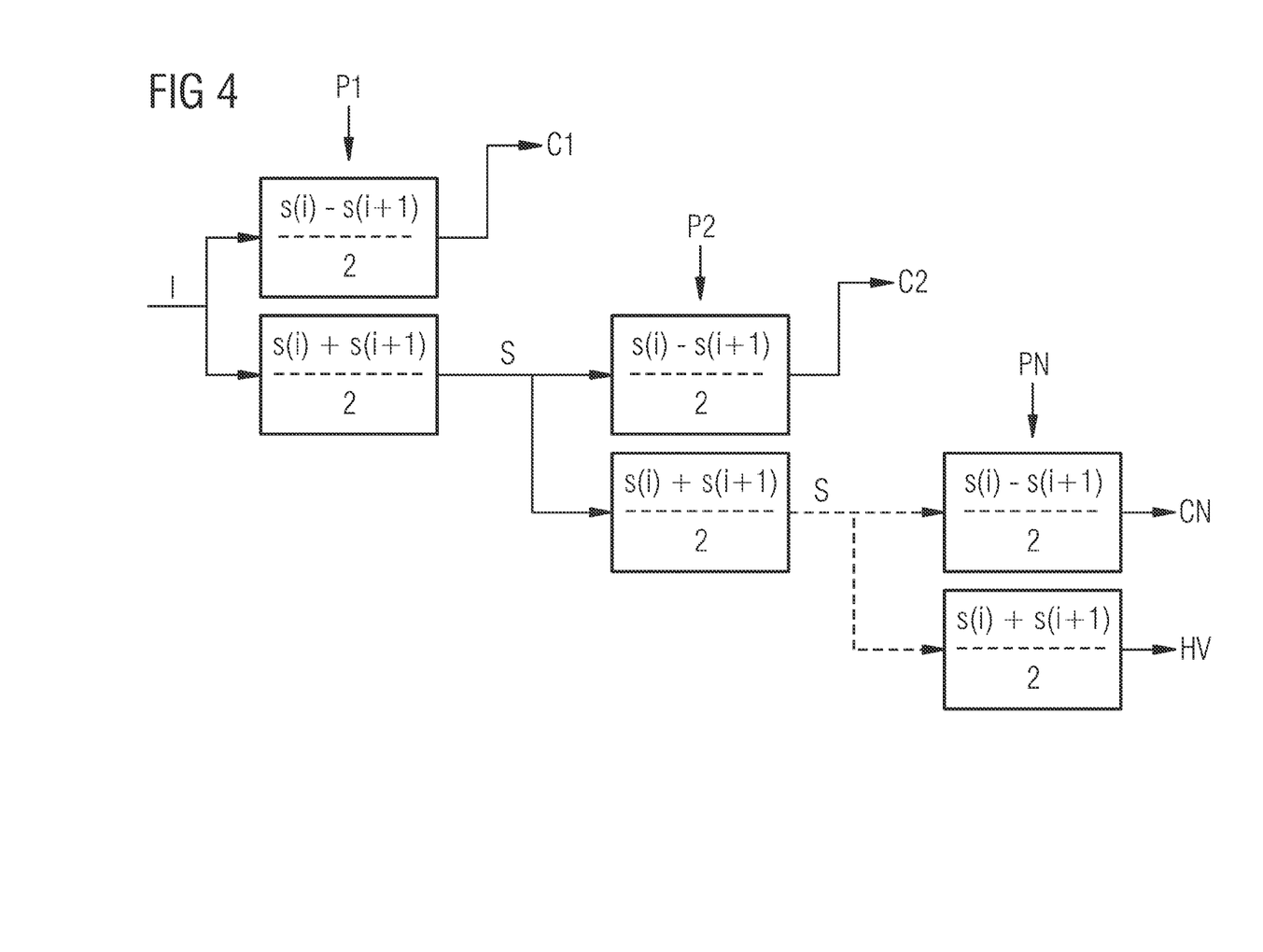
FIG. 4 is an illustration explaining the wavelet transform used according to certain embodiments.

The forecaster shown in FIG. 3 includes a wavelet filter bank WFB receiving the above described input I corresponding to the data arrival history curve. The wavelet filter bank performs a wavelet transform on the input signal I, where wavelet transforms per se are known. A wavelet transform provides information on both time and frequency domain of an input signal. The wavelet transform filters a signal in several passes considering detail levels of the signal. FIG. 4 shows an example for a recursive computation of a wavelet transform which is used in the embodiment described herein. In this example, the input signal I comprises a plurality of values $s(i)$ at different distinctive time frames where 256 frames are considered. Three passes P1, P2 and PN are shown, where the first pass is designated as P1, the second pass is designated as P2 and the third pass which is the last pass in the transform is designated as PN. In each pass, the input signal I or the smoothed signal S from the preceding pass is analyzed by computing the difference $(s(i)-s(i+1))/2$ between values of adjacent time intervals, where the length of a time interval from one pass to the next pass doubles. Furthermore, the smoothed signal S is computed as the average value (s(i)+s(i+1))/2.

The wavelet transform of FIG. 4 is based on the well-known Haar wavelet as the mother wavelet. This wavelet is defined as follows:

$$H(t) = \begin{cases} 1 & \text{if } -\frac{1}{2} < t < 0 \\ -1 & \text{if } 0 \leq t < \frac{1}{2} \\ 0 & \text{otherwise} \end{cases}$$

Advantages of the Haar mother wavelet include its computational simplicity and the fact that it yields filtered components having the shape of a step function. This is practical to extract requests that can be represented graphically as rectangles.

According to FIG. 4, each pass of the wavelet transform on the input signal I catches details of a certain level. The first pass reveals one-frame wide details, i.e. high frequencies, the second one details of two frames, the third of four frames and so on. The ith pass produces a set of wavelet coefficients $C_i$. FIG. 4 shows the coefficients $C_1$, $C_2$ and $C_N$ for the passes $P_1$, $P_2$ and $P_N$, respectively. In the embodiment of FIG. 4, the input signal I starts with a size of 256 time frames. The first pass P1 of the wavelet transform returns a smoothed signal of size 128 and an array of wavelet coefficients, also of size 128, corresponding to C1 in FIG. 4. The process is recursively repeated on the smoothed signal as shown in FIG. 4. Each time, the length of the resulting smoothed signal and the number of coefficients are divided by two. After the last pass PN, a single wavelet coefficient CN (N=8) and the Haar value HV are received, which is in fact the input signal average (recursive average of a pair of samples). The whole wavelet transform thus returns a set of coefficient rows of decreasing length, where each row corresponds to a certain detail level. The reverse wavelet transform reconstructs the original signal from the wavelet coefficients.

To keep only details of a certain level, it is necessary to delete all coefficients except the row of interest and reconstruct a signal with the inverse wavelet transform based on this altered set of coefficients. This effectively extracts from the initial signal its step function components with steps of width a power of two depending on what coefficients C1 have been kept.

The following table lists the size of wavelet coefficient arrays and the corresponding details (step size/width in number of time frames) for an input signal of length 256:

| | Wavelet coefficients | | | | | | | | |
|---|---|---|---|---|---|---|---|---|---|
| | C1 | C2 | C3 | C4 | C5 | C6 | C7 | C8 | Haar value |
| Length | 128 | 64 | 32 | 16 | 8 | 4 | 2 | 1 | 1 |
| Step size | 1 | 2 | 4 | 8 | 16 | 32 | 64 | 128 | average |

Values change in consequence if the signal length is another power of two. This value of 256 has been chosen because it leads to details of width up to 128 frames. Such details match to a so-called persistence P6 which also corresponds to 128 frames. Details of smaller width match smaller persistences. In the embodiment described herein, a persistence value describes the time length in frames for which a bandwidth request as described later on is valid. Persistence value P1 refers to one frame, persistence value P2 to two frames, persistence value P3 to four frames, persistence value P4 to eight frames, persistence value P5 to 32 frames, persistence value P6 to 128 frames and persistence value P7 to an infinite number of frames.

Figure 5:
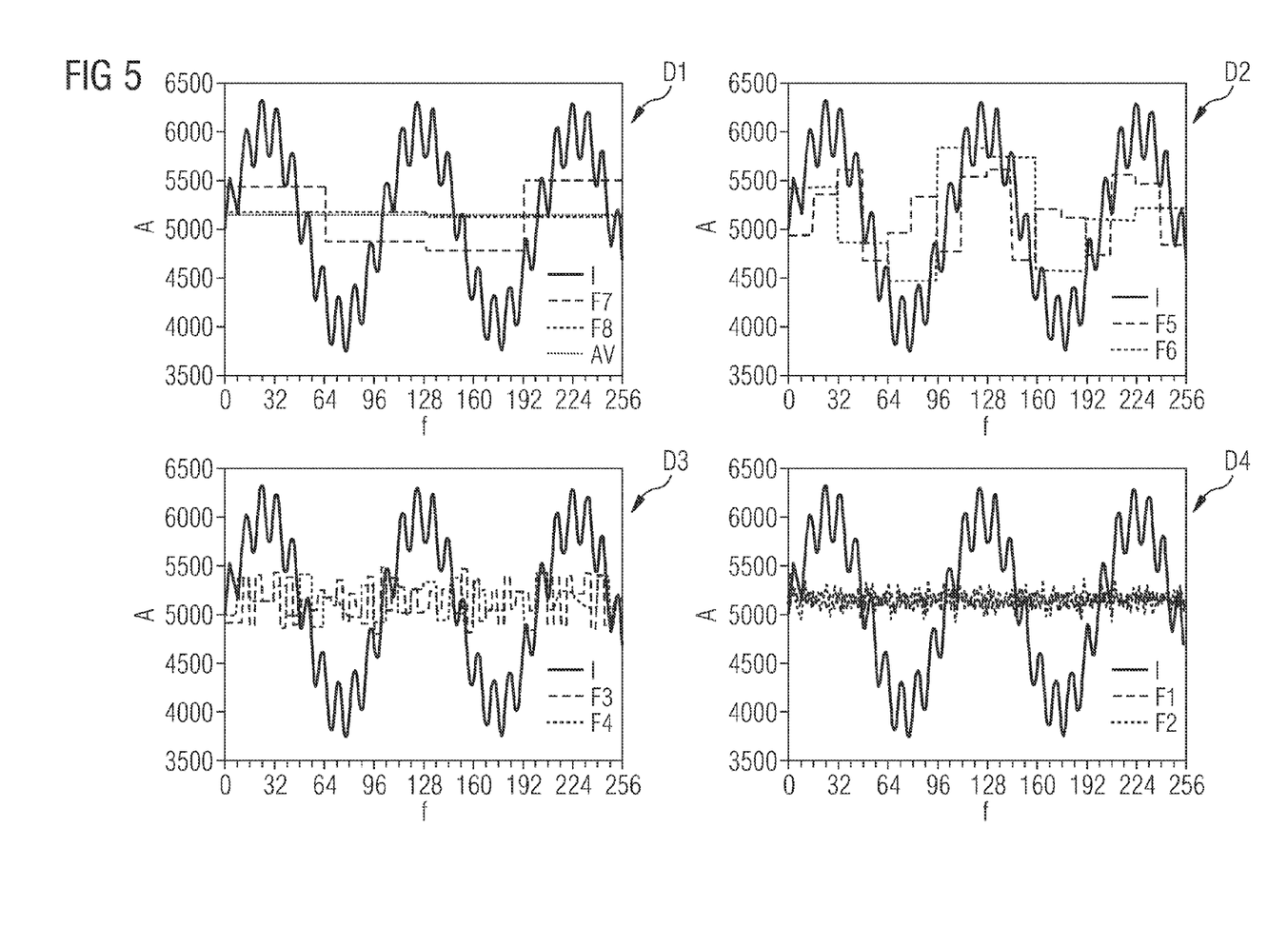
FIG. 5 shows diagrams explaining an example of a wavelet transform used according to certain embodiments.

FIG. 5 shows an example of the results of a wavelet filtering based on four diagrams D1 to D4. Each diagram D1 to D4 shows along the abscissa the frame number f and along the ordinate the amount A of data in bytes. The original signal I is shown by a solid line corresponding to a modulated sine function. Each diagram includes filtered signals/components F1, F2, ..., F8 (dashed lines) being based on respective wavelet coefficients C1, ..., C8. Furthermore, the average AV of the signal I is plotted in diagram D1. As can be seen from the diagrams, each component F1 to F8 corresponds to a step function, where the level of detail decreases from F1 to F8. The function F1 is the filtered component extracted from the coefficient array C1 and, thus, has a detail width of one frame (high frequency). Contrary to that, the filtered component F8 is extracted from the wavelet coefficient array C8 and has a detail width of 128 frames (low frequency).

The diagrams shown in FIG. 5 illustrate the multilevel decomposition as it is used in the bandwidth reservation framework as described herein. To reconstruct the original signal from the filtered components shown in FIG. 5, one just has to sum the eight components and to subtract seven times the average value in order to keep it only once in the final sum.

Coming back to FIG. 3, the wavelet filter bank WFB results in corresponding filtered components F1 to F8 which are thereafter input in a so-called frame aggregation module FA which will be described in the following. The result of the filtering process according to the wavelet filter bank WFB is used to extract training patterns for neural networks performing the forecast as described later on. The size of the input layer, i.e. the number of input neurons, is one of the elements that influences the computational time needed for neural network training. Each sample of a signal used for the training is assigned to one input neuron in the embodiment described herein. Each filtered component from the wavelet filtering process is a 256-frame long step signal, from which a 128-frame long part will be used as input for a neural network. For each component, a separate neural network is used resulting in eight neural networks. This implies 128 input neurons for each of the eight neural networks. However, as the filtered signals are step functions with a certain power of two for step width, some information is redundant. Instead of using the value for each frame in the filtered signal as input for one neuron, the amplitude of each step is used in the embodiment described herein. This allows to reduce the number of input neurons without loosing information and, hence, to speed up the training phase of neural networks. This procedure refers to a frame aggregation where frames are aggregated by keeping only once the amplitude of each step. This frame aggregation is performed by frame aggregation module FA in FIG. 3.

For example, the fourth filtered component F4 is a step function with a step width of $2^3=8$ frames. The frame aggregation will retain only the 1st, 9th, 17th, ... samples. Indeed, the first eight samples have the same value (step amplitude). The same is true for the eight following and so on. This aggregated signal will be used to feed the fourth neural network. In this case, removing redundant information reduces the number of input neurons by a factor 8. Hence, each neural network used for forecasting will benefit from the frame aggregation, except the one associated with the first filtered component. This is because the first filtered component has a step width of one frame and, thus, the frame aggregation has no effect.

The output layer of each neural network is also reduced in the same proportion by the use of the above described frame aggregation. The output of each neural network will be deaggregated to restore the initial step shape as described later on. Coming back to FIG. 3, the frame aggregation module FA provides aggregated/compacted signals CF1, CF2, ..., CF8 for each filtered component F1, F2, ..., F8. Those compacted signals will be fed to a module comprising eight neural networks to forecast the data arrivals in the future. The neural networks are designated as NN in FIG. 3. The neural networks NN are trained to forecast the eight filtered signals. They use sigmoid activation functions. The neural networks learn progressively to recognize the input patterns and return the corresponding output patterns. Patterns are extracted from the arrival data signal in two steps by first performing the above described wavelet transform and then extracting the actual pattern from the filtered components.

In the embodiment described herein, the arrival history has a size of 512 frames. This history is divided in two parts of length 256. Both halves are filtered with the above described wavelet filter bank WFB that transforms them in two sets of eight filtered signals of length 256 frames. By combining each couple of corresponding filtered signals, the resulting length of 512 frames for the arrival history is obtained.

In the embodiment described herein, the neural networks are trained in regular intervals where the training patterns are extracted from the filtered signals depending on the following two parameters:

window: This specifies the number of samples used as input.
lookAhead: This is the number of forecasted frames.

In one example, the parameters window and lookAhead have been set to 128 and 150 respectively. Theses two parameters are used as base for the construction of the input and output layer of each neural network, but with successive division by two due to the above described frame aggregation. The number of neurons on input and output layers for each of the eight neural networks NN1, NN2, ..., NN8 filtering the eight filtered components are listed in the following table:

|  | Neural network | | | | | | | |
| --- | --- | --- | --- | --- | --- | --- | --- | --- |
|  | NN1 | NN2 | NN3 | NN4 | NN5 | NN6 | NN7 | NN8 |
| Input neurons | 128 | 64 | 62 | 16 | 8 | 4 | 2 | 2 |
| Output neurons | 150 | 75 | 38 | 19 | 10 | 5 | 3 | 2 |

Figure 6:
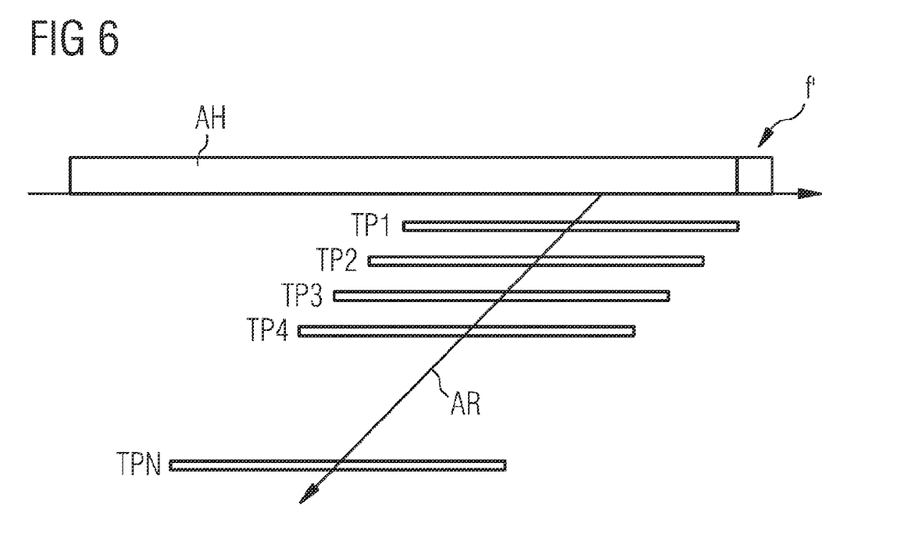
FIG. 6 illustrates the training of the neural networks according to an example embodiment.

Considering the case of the first neural network NN1 without frame aggregation, this network needs a training pattern comprising 278 samples, 128 for the input and 150 for the desired output. Hence, from the first filtered component (of length 512), 512−(128+150)+1=235 training patterns are extracted. In case of the second neural network NN2, the filtered signal has a length of 256 due to the frame aggregation. The division by two is also true for the number of input and output neurons. Consequently, 256−(64+75)+1=118 training patterns can be extracted. For each neural network, the extraction begins by the latest available pattern, i.e. by the pattern whose desired outcome ends at the last completed frame. Training patterns are further extracted by moving one frame at a time in the past. This pattern extraction process is illustrated in FIG. 6. This figure shows as a horizontal bar AH an arrival history of 512 frames where the current frame is designated as f. Subsequent training patterns TP1, TP2, TP3, TP4, ..., TPN are indicated as horizontal bars below the frame history AH. The training patterns are split by an arrow AR where the bar of each training pattern on the left side of the arrow refers to the frames input for training and the bar of each training pattern on the right side of the arrow refers to the desired output used during training.

Neural network training is a computationally expensive task. In the method disclosed herein, training has to be done repeatedly for the neural networks to adapt their recognition capabilities to the arrival data signal. However, the training time should be kept reasonable. To do so, in the embodiment described herein, training occurs at regular intervals (specified by a training interval parameter) and the maximum number of extracted training patterns is limited by a training limit parameter.

The neural networks NN according to FIG. 3 generate an output in the form of forecasts FO1, FO2, ..., FO8 for each filtered and compacted signal CF1, CF2, ..., CF8. Those forecasts are fed to the module SLC performing a signal level correction. This optional correction is done because the output of a neural network has rarely the exact expected value, even if the pattern is correctly recognized. For example, a neural network trained to solve the binary XOR problem may return instead of the value 1 the value 0.97 or instead of the value 0 the value 0.02. Knowing the set of possible output values enables to correct the former outputs with 1 and 0, respectively. In the embodiment described herein, the signal level correction tries to correct the output using the set of values recorded for the last n trainings, where n is a configuration parameter.

The corrected signals FO1', FO2', ..., FO8' output by the signal level correction module SLC are fed to the module FD performing a frame deaggregation of the still aggregated signals FO1', FO2', ..., FO8'. This results in expanded signal EF1, EF2, ..., EF8 for each filtered component. Thereafter, those expanded signals are recombined in module REC resulting in the overall forecasted arrival history FI based on the input signal I. This signal forms the output of the neural wavelet forecaster NWF shown in FIG. 2 and is fed to the request packer RP of the request generator RQ.

As explained above, the frame aggregation allows reducing the number of neurons in the neural networks, thus resulting in a reduced computation time. The field length for the frame number of a bandwidth request in the standard IEEE 802.16 is such that a request cannot start more than 128 frames after it was sent. That means that the useful area for P6 requests goes up to 256 frames in the future, for P5 160 frames and so on. This provides a first boundary for the above specified lookAhead parameter of the neural networks.

The requests sent according to the embodiment described herein include an additional field indicating a desired start frame, i.e., the frame number in the future where the bandwidth allocation should preferably begin. However, if there is another transmission opportunity within the next τ frames, it is not necessary to issue a request with a desired start frame after τ. Indeed, during the next transmission opportunity there will be fresher input data for a better forecast. In fact, this is also the case for the opportunity after next because of the grant confirm, but the reasoning stays the same.

Figure 7:
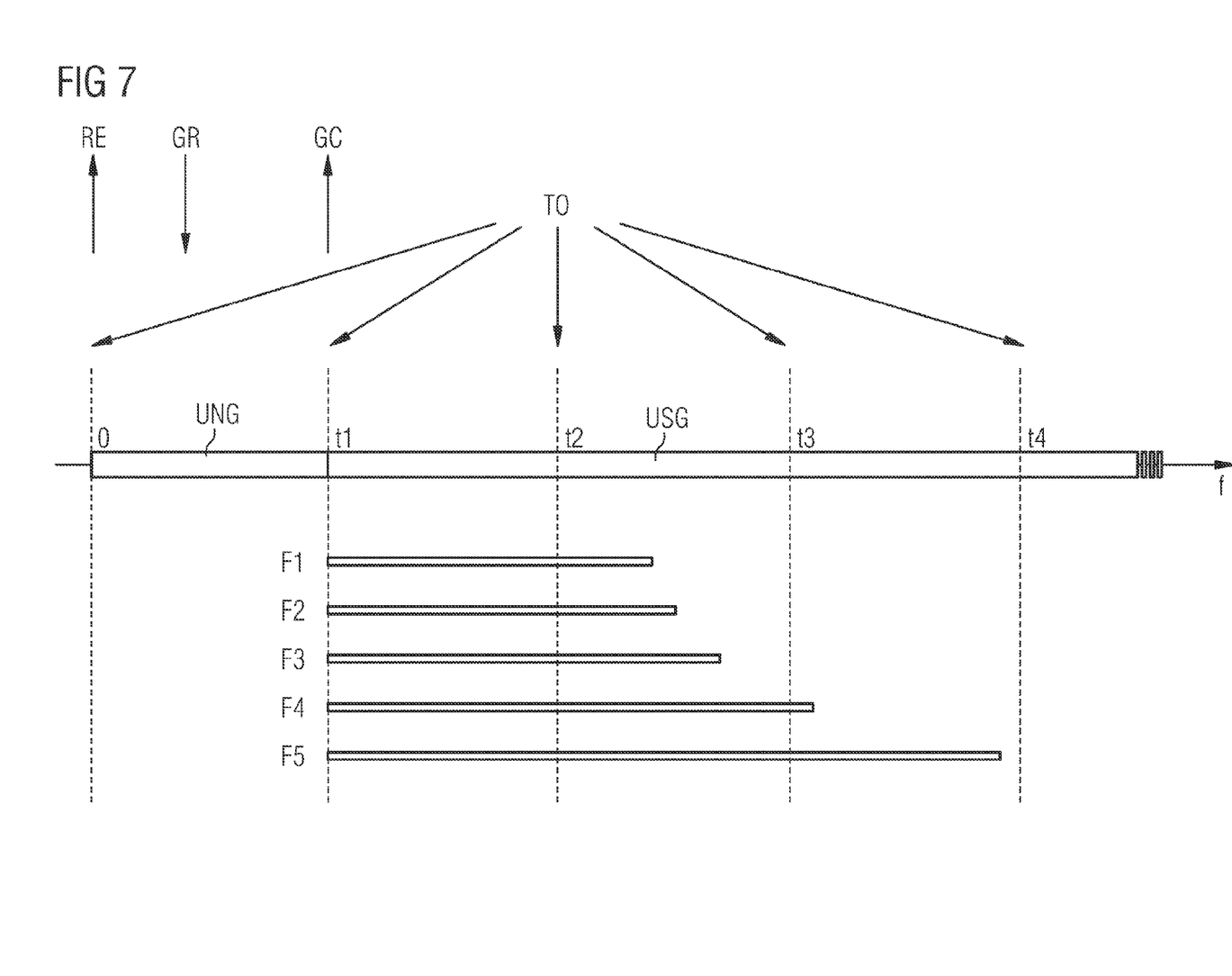
FIG. 7 shows the process of reserving bandwidth according to an example embodiment.

FIG. 7 shows the process of reserving bandwidth and transmitting data as used according to one embodiment. In this figure, the time axis is represented in the horizontal direction by subsequent frames f. The bandwidth reservation is done by the above described three-way handshake where a first node requesting bandwidth sends a corresponding request RE to a second node. The second node grants bandwidth based on the request by sending a grant message GR. Thereafter, the first node answers the grant message GR by a grant confirm GC. Bandwidth may only be used by the first node in time intervals after the grant confirm has been sent. Hence, granted bandwidth in the time interval UNG between 0 and t1 (excluding t1) is not usable. FIG. 7 further shows transmission opportunities TO of the first node which occur at respective time slots 0, t1, t2, t3 and t4. Due to the three-way handshake mechanism, the earliest usable slots are t1, t2, t3, t4 and so on. These slots are located within the bar USG designating the time interval of usable granted bandwidth.

For each persistence level of a bandwidth request and thus for each detail level in terms of wavelet filtering, there are different time zones of interest in the form of specific forecast areas. For the filtered components F1 to F5, examples of those forecast areas are indicated by horizontal bars in FIG. 7. Bandwidth requests are sent in the standard IEEE 802.16 in corresponding MSH-DSCH messages. The number of requests is limited in those messages. Hence, requests for reserving bandwidth are sent in regular intervals. Requests sent in a new MSH-DSCH message are based on an updated forecast of the data arrivals. As a consequence, the requests already existing are updated based on the newly available forecasts.

According to certain embodiments, selected types of post-processing of the outputs of the neural networks may be used. This post-processing is implemented as part of the processing step c) according to claim 1. Some preferred post-processing methods are explained in the following.

As a first post-processing method, spikes may be removed to smooth the forecasted signal. A spike is detected when a signal rise and a signal fall bigger than a given threshold are separated by less than a certain number of frames (spike width). As another post-processing method, rescaling may be used. To do so, the forecasted signal is linearly rescaled such that its minimum and maximum match those of the input signal. This rescaling relies on the assumption that the time window of the forecasted signal is big enough to retain all signal variations. As another post-processing method, damping may be performed. To do so, the forecast is shifted by an offset which is adjusted with feedback. The feedback is computed as the mean difference of the arrival data and the reserved bandwidth over the past n frames. The feedback is added to the value of each forecasted frame. This way, if the forecaster had caused too much reservation previously, the feedback will be negative and the forecast signal will be reduced. The other way round, too little reservation will tend to increase the forecast signal by adding a positive feedback.

In the following, the generation of the bandwidth requests based on the forecasted signal FI input in the request packer RP shown in FIG. 2 will be described. The task of the request packer is to issue bandwidth requests covering the future arrivals forecasted by the neural wavelet forecaster. The method performed by the request packer is based on rectangles. Each rectangle represents a bandwidth request. The height of a rectangle corresponds to the demand level, i.e. the amount of data in minislots of the bandwidth request, and the width of a rectangle refers to the number of frames corresponding to the persistence level of the bandwidth request. The request packer will fill the area under the forecasted curve of arrival data with such tiles of rectangles. Actually, the input signal for the request packer is the forecasted signal from which already reserved minislots have been subtracted. Indeed, previous granted requests (of persistence greater than 1) will be still active and will take care of part of the forecasted arrivals.

Up to now, the unit of the forecasted signal was the amount of data in byte. Contrary to that, the unit used by the request packer will be the minislot referring to a specified amount of transmitted data. To switch from byte to minislots, a quantization of the forecasted signal is performed by rounding each sample (and not taking the floor or ceil value) assuming that the number of samples rounded by excess will compensate the samples rounded by default.

The packing method used by the request packer performs successive horizontal scans to detect boundaries in the quantized forecasted signal. Boundaries are points on the border between the domain to cover with rectangles and the rest (respectively below and above the input signal). Boundaries can be left or right boundaries. A left boundary occurs when the signal curve increase, a decrease corresponds to the right boundary. Rectangles are then created between left and right boundary points. This occurs width first, i.e. a rectangle has always the maximum width possible and only then the height is set to the maximum allowed by the boundary. In the actual method, boundary and rectangle detection are performed simultaneously to improve efficiency. Requests are finally extracted from the resulting set of detected rectangles.

In order to reduce the number of requests needed to pack the domain, some overfitting techniques are used. First, for a given width w, it can be possible to increase the demand level by allowing some extra minislots to be covered by this rectangle and by doing so to merge two or more rectangles together. Secondly, increasing the rectangle width a little can reduce the number of requests for this rectangle. E.g., for a rectangle of width 30, the translation of the width in terms of persistence levels will lead to five requests: three P4, one P3, and one P2 (30=3*8+4+2). Allowing two extra time frames reduces the set of requests to only P5. The maximal extra minislots at extra frames allowed are parameters of the packing method. A third parameter is used to limit the region where requests can start. This makes sense because the forecasted signal is likely to be more accurate for a smaller lookahead, so a better request can be send during the next transmission opportunity.

Figure 8:
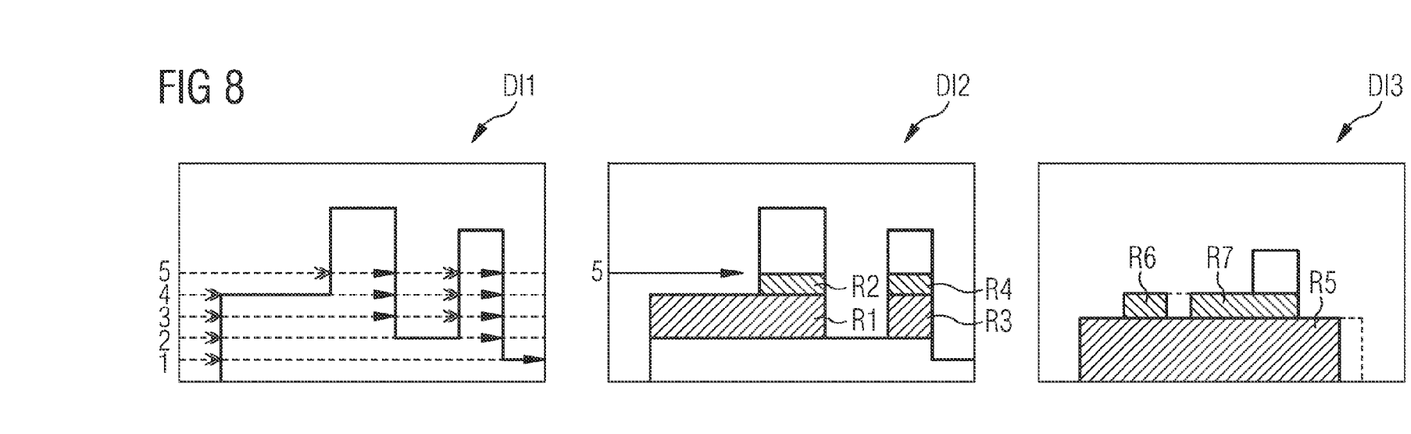
FIG. 8 illustrates the generation of bandwidth requests according to an example embodiment.

A graphical explanation of the above explained packing method is shown in FIG. 8. Diagram DI1 shows the detection of left and right boundaries during five successive horizontal scans 1, 2, . . . , 5. The detections of left boundaries are indicated by double arrow heads whereas the detections of right boundaries are indicated by single arrow heads. During each horizontal scan according to diagram DI1, rectangles of a height 1 are created with the discovered boundaries. Those rectangles are merged with previously found rectangles. Merging occurs if the induced overfitting is within the allowed bounds. Diagram DI2 of FIG. 8 shows the merging of rectangles in the vertical direction after the fifth horizontal scan. According to this diagram, rectangle R1 and rectangle R2 will not be merged due to the difference in width. Contrary to that, rectangle R3 and rectangle R4 will be merged to one rectangle. Diagram DI3 shows an example of varying the width of rectangles in the horizontal direction in order to reduce the number of requests for one rectangle and/or to merge rectangles in the horizontal direction. Diagram DI3 shows the increase of the width of rectangles R5 and R6 of one frame indicated as a dotted line. For rectangle R6, the increase of width will result in a merged rectangle combining rectangle R6 and R7.

A pseudocode of the above explained packing method is listed in the following:

```
 1:     d ← 1
 2:     repeat
 3:         L, R ← 0
 4:         frame ← 1
 5:         repeat
 6:             if left boundary l found then
 7:                 L ← L ∪ l
 8:             end if
 9:             if right boundary r found then
10:                 R ← R ∪ r
11:             end if
12:             frame ← frame + 1
13:         until frame = window
14:         Rect ← fusion(Rect, L, R)
15:         d ← d + 1
16:     until d > dmax
17:     for rect ∈ Rect do
18:         rect ← optimizeLength(rect, extraFrames)
19:         Req ← Req ∪ requests(rect)
20:     end for
21:     function fusion(Rect, L, R)
22:         for rect from L and R do
23:             for r ∈ Rect do
24:                 m ← merge(r, rect)
25:                 if overfit(m) ≤ extraMinislot then
26:                     Rect ← Rect\{r} ∪ m
27:                 else
28:                     Rect ← Rect ∪ rect
29:                 end if
30:             end for
31:         end for
32:     end function
```

Definitions:
d: Current demand level, index for the vertical scan
f: Current frame, index for the horizontal scan
window: Limit of the horizontal scan
L: Set of left boundaries detected
R: Set of right boundaries detected
Rect: Set of rectangles detected
Req: Set of requests converted from Rect The rectangle detection phase starts in line 1 of the pseudocode. The vertical scan begins in line 2 with a repeat loop. The horizontal scan begins in line 5 with a repeat loop. According to line 6 of the pseudocode, the left side of a rectangle is detected. According to line 9 of the pseudocode, a right side of a rectangle is detected. In line 12 of the pseudocode, the horizontal scan index is updated. In line 13 of the pseudocode, it is detected that the horizontal limit is reached. In line 14 of the pseudocode, the fusion of rectangles takes place. In line 16 of the pseudocode, it is detected that the vertical limit is reached. The request extraction phase of the rectangles starts in line 17. In line 18, the number of requests is minimized with length overfitting. In line 21, the function for merging new rectangles from boundaries with existing rectangles starts. In line 25, the overfit is merged within the allowed bounds. In line 26, the merge is kept. In line 28, the merge is discarded and the rectangle rect is added.

Figure 9:
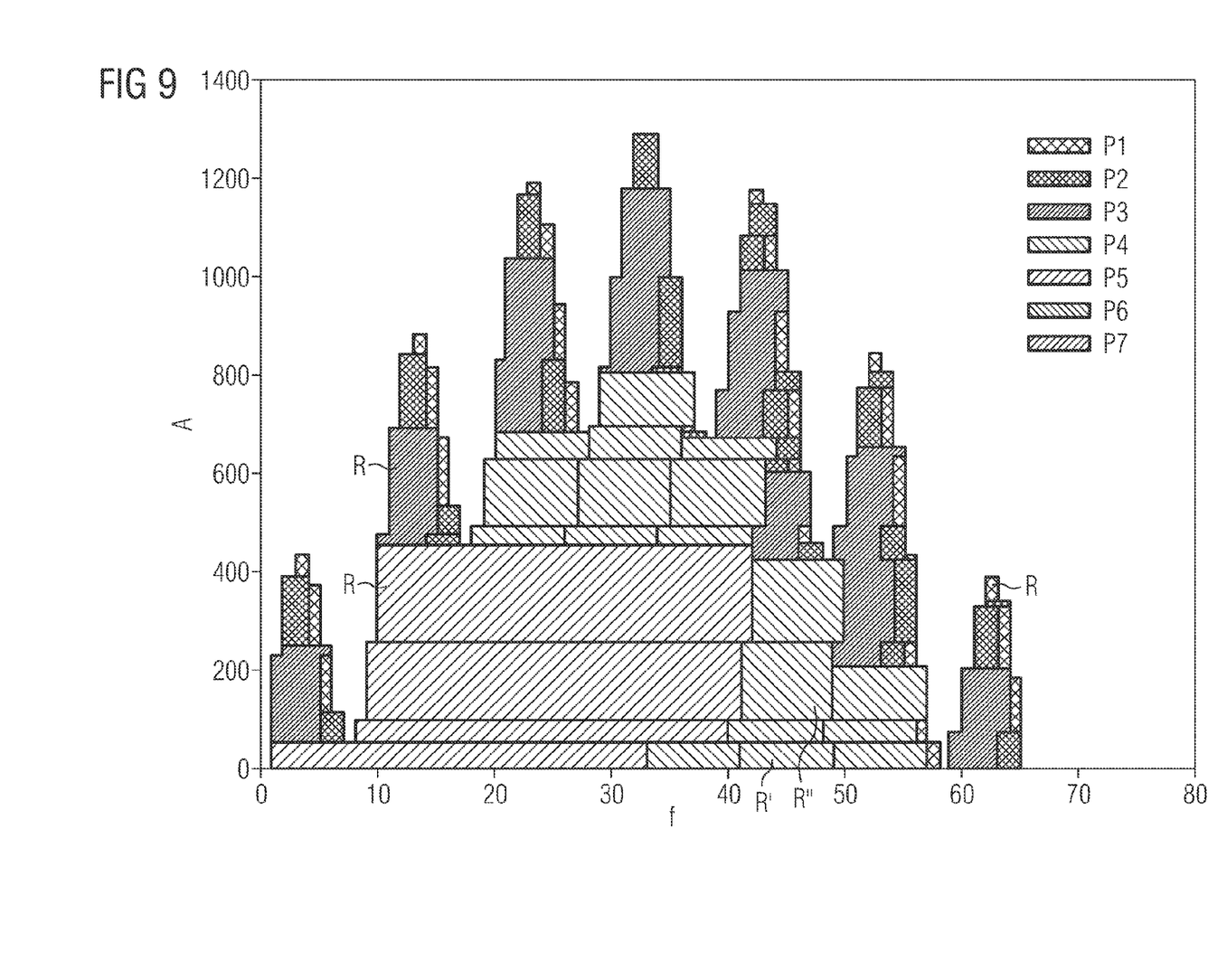
FIG. 9 shows a diagram including the bandwidth requests as generated according to an example embodiment.

FIG. 9 is an example of the result of the above described packing method. FIG. 9 shows the quantized forecast curve of data arrivals substantially corresponding to the outermost boundaries of the rectangles shown in this figure. For clarity reasons, only some of the rectangles shown in FIG. 9 are designated by reference numerals R. The abscissa in the diagram of FIG. 9 corresponds to the frame number f and the ordinate to the amount of data A in bytes. This curve is filled with rectangles indicated by different hatchings/fillings where each hatching/filling corresponds to one of the persistence levels P1, . . . , P7 of the requests. The height of each rectangle refers to the amount of data to be reserved by the corresponding request represented by a rectangle. As can be seen from FIG. 9, the result of the method is a filling of the area under the forecast curve with a minimal number of rectangles according to the persistence levels where each rectangle corresponds to a bandwidth request. To furthermore reduce the number of requests, rectangles having the same left and right boundaries in the diagram of FIG. 9 can be merged to one rectangle. Such rectangles are designated as R' and R" in FIG. 9. The merging of those rectangles results in a single bandwidth request for them.

According to the method described herein, the bandwidth requests also include so-called P0 requests which are treated specially. For requests of persistence level P1 to P7, the method only needs to split the width of detected rectangles over the persistence length, where a parameter lengthForP7 sets an arbitrary length for persistence P7. This parameter must obviously be greater than 128 frames. P0 requests are used to reduce or cancel a P7 request, i.e. a long-time reservation, when too much minislots are reserved by the P7 request. As explained above, the request packer input is the forecasted arrival curve where already reserved minislots have been substracted. This way, too much reserved bandwidth in a frame will appear as a negative value. The detection of "P0 rectangles" works quite like the detection of P7 rectangles, via a lengthForP0 parameter, but in the negative domain. The choice of the length based on this parameter should not be too small which will likely detect over-reservations caused by smaller persistences and may degrade a good ongoing reservation based on a P7 request, causing oscillation. On the other hand, the length should not be too long which will cause delay in reducing reservations based on P7 requests.

In order to account for wrong forecasts, the buffer BF of the node is monitored by the buffer state processor BSP shown in FIG. 2. Actually, in an ideal scenario of perfect forecasts, the buffer would always be empty. However, as errors will occur in the forecasts, a mechanism is needed to empty the buffer of packets accumulated because of forecast errors. The buffer can also fill up if in a frame more data than can be transmitted in a single frame arrive. Based on the buffer state BS monitored by the buffer state processor BSP, the buffer drainer BD communicating with the buffer state processor will issue a request based on the data currently in the buffer. In the embodiment described herein, the variation rate of the buffer occupancy is computed with an auto-regressive manner over the last two frames. It represents the data per frame that the buffer drainer expects to have to send the next few frames. It distinguishes then two things: the data related to the computed rate, and the amount of data that will arrive until the bandwidth corresponding to the rate part is effectively reserved. Two requests are sent, one for the rate part with a medium persistence level, the other for the remaining part, which can be sent within one frame or spent over more frames to avoid a too big demand level and the risk of an ungrantable request. The persistence used for the rate part and the rest part are configuration parameters of the method.

The above described method for reserving bandwidth enables the forecast of bandwidth in the future and generates corresponding bandwidth requests based on these forecasts. The method reduces the delay for transmitting data from one node to another in a communication network and it was described based on the MeSH mode of the IEEE standard 802.16. Several simulations were performed based on the method disclosed herein, leading to good results in terms of a reduced delay in the data transmission from one node to another.

References

[1] N. Groschwitz and G. Polyzos: "A Time Series Model of Long-term NSFNET Backbone Traffic", In: IEEE ICC'94, volume 3, pages 1400-1404, 1994.
[2] B. Krithikaivasan, Y. Zeng, K. Deka and D. Medhi: "ARCH-based Traffic Forecasting and Dynamic Bandwidth Provisioning for Periodically Measured Nonstationary Traffic", In: IEEE/ACM Transactions on Networking, volume 15, 2007.
[3] S. Chong, S-Q. Li and J. Ghosh: "Dynamic Bandwidth Allocation for Efficient Transport of Real-time VBR Video over ATM", IEEE Journal on Selected Areas in Communications, 13:12-23, 1995.
[4] A. Aussem and F. Murtagh: "Web Traffic Demand Forecasting using Wavelet-Based Multiscale Decomposition", International Journal of Intelligent Systems, 16:215-236.
[5] P. Barford, J. Kline, D. Plonka and A. Ron: "A Signal Analysis of Network Traffic Anomalies", In: Internet Measurement Workshop 2002, 2002.

What is claimed is:

1. A method for data transmission in a communication network comprising a plurality of nodes where a data transmission from a first node to a second node in the network comprises:
(a) analysing data arriving in a data buffer of the first node such that an arrival history curve describing the amounts of data arriving in the buffer over a past time period is generated;
(b) processing the arrival history curve, said processing including a wavelet transform on the arrival history curve and resulting in a plurality of signals, each signal corresponding to a filtered component of the wavelet transform;
(c) processing each signal in a separate neural network trained with training patterns which are based on data arrived in the past in the buffer, resulting in forecast signals for data arrivals in the future;
(d) recombining the forecast signals resulting in an arrival forecast curve describing the amounts of data arriving in the buffer in a future time period;
(e) the first node generating bandwidth requests for reserving bandwidth based on the arrival forecast curve and transmitting the bandwidth requests to the second node;
(f) the second node allocating bandwidth based on the bandwidth requests received from the first node; and
(g) transmitting data from the first node to the second node within the allocated bandwidth.

2. The method of claim 1, wherein data is transmitted as MAC protocol data units on the MAC layer.

3. The method of claim 1, wherein data is transmitted in a data subframe of a predetermined time interval and control messages including bandwidth requests are transmitted in a control subframe of the predetermined time interval.

4. The method of claim 1, wherein the communication network is a wireless network operated in the MeSH mode of standard IEEE 802.16.

5. The method of claim 1, wherein the wavelet transform in step (b) is based on the Haar wavelet as the mother wavelet.

6. The method of claim 1, wherein each filtered component of the wavelet transform includes a plurality of coefficients, each coefficient being associated with a time step in the past time period, the time steps being different for each filtered component.

7. The method of claim 6, wherein each filtered component is compacted by merging coefficients with the same value in adjacent time steps in the past time period, the compacted signal being the signal generated in step (b).

8. The method of claim 7, wherein each neural network includes a plurality of input neurons and output neurons, where each input neuron receives a merged coefficient in the past and each output neuron provides merged coefficients in the future.

9. The method of claim 1, wherein a signal correction is applied in step (c) on the outputs of the neural networks based on values of earlier training patterns.

10. The method of claim 1, wherein the neural networks are trained during data transmission in regular time intervals or continuously.

11. The method of claim 1, wherein the bandwidth requests generated in step (e) specify an amount of data to be reserved for transmission and a persistence value defining a time length for which the amount of data is to be reserved.

12. The method of claim 11, wherein the bandwidth requests are generated in step (e) by:
transferring the arrival forecast curve in a quantized forecast curve which is quantized based on a data size unit used for reserving bandwidth; and
applying a filling procedure for filling the area under the quantized forecast curve with bandwidth requests being represented by rectangles having a length in the time direction corresponding to the time length according to the persistence value of the bandwidth request and having a height corresponding to the amount of data specified in the bandwidth request.

13. The method of claim 12, wherein the filling procedure comprises:
(i) detecting left and right boundaries by scanning the quantized forecast curve in successive scans in the time direction, where areas covered between a left and right boundary within a scan are associated with a first rectangle;
(ii) merging first rectangles with the same left and right boundaries to second rectangles; and
(iii) filling the second rectangles in the time direction with rectangles of bandwidth requests such that a minimum number of rectangles is included in each second rectangle.

14. The method of claim 13, wherein step (ii) includes an overfitting procedure in which the length of each second rectangle is increased by a predetermined value and, in case that this increase results in adjacent or overlapping second rectangles which can be merged to a new second rectangle, the new second rectangle substitutes for the adjacent or overlapping second rectangles.

15. The method of claim 13, wherein the rectangles of bandwidth requests having the same left and right boundaries are merged to one bandwidth request.

16. The method of claim 1, wherein the state of the buffer in the first node is monitored and additional bandwidth requests are sent based on the state of the buffer for correcting errors in the arrival forecast curve.

17. The method of claim 1, wherein the bandwidth request generated by the first node includes a field indicating a desired start time at which the bandwidth according to the bandwidth request should be allocated.

18. The method of claim 17, wherein the communication network is a wireless communication network operated in the MeSH mode of standard IEEE 802.16 where the bandwidth request is included in a MSH-DSCH message.

19. A network node for use in a method for data transmission in a communications network, comprising:

analysing means for analysing data arriving in a data buffer of the node such that an arrival history curve describing the amounts of data arriving in the buffer over a past time period is generated;

processing means for processing the arrival history curve, said processing means performing a wavelet transform on the arrival history curve and generating a plurality of signals, each signal corresponding to a filtered component of the wavelet transform;

neural network processing means for processing each signal in a separate neural network trained with training patterns which are based on data arrived in the past in the buffer, resulting in forecast signals for data arrivals in the future;

recombining means for recombining the forecast signals resulting in an arrival forecast curve describing the amounts of data arriving in the buffer in a future time period;

generating means for generating bandwidth requests for reserving bandwidth based on the arrival forecast curve and transmitting the bandwidth requests to a second node; and scheduling means for transmitting data to the second node based on the bandwidth allocated by the second node in response to the bandwidth requests.

20. The network node of claim 19, comprising at least one of:

transmitting means for transmitting bandwidth requests including a field indicating a desired start time at which the bandwidth according to the bandwidth request should be allocated; and processing means for receiving bandwidth requests including a field indicating a desired start time and for allocating bandwidth according to the respective bandwidth request at the desired start time.

\* \* \* \* \*